United States Patent
Yun et al.

(10) Patent No.: US 10,684,395 B2
(45) Date of Patent: Jun. 16, 2020

(54) REFRACTIVE-INDEX-MATCHING THIN FILM

(71) Applicant: UNID CO., LTD., Seoul (KR)

(72) Inventors: Dong Shin Yun, Siheung-si (KR); Sang Min Kim, Uiwang-si (KR)

(73) Assignee: UNID CO., LTD., Seoul (KR)

( * ) Notice: Subject to any disclaimer, the term of this patent is extended or adjusted under 35 U.S.C. 154(b) by 0 days.

(21) Appl. No.: 15/771,697

(22) PCT Filed: Mar. 28, 2016

(86) PCT No.: PCT/KR2016/003159
§ 371 (c)(1),
(2) Date: Apr. 27, 2018

(87) PCT Pub. No.: WO2017/164449
PCT Pub. Date: Sep. 28, 2017

(65) Prior Publication Data
US 2019/0064397 A1 Feb. 28, 2019

(30) Foreign Application Priority Data
Mar. 24, 2016 (KR) .................. 10-2016-0035010

(51) Int. Cl.
*G02B 1/14* (2015.01)
*C03C 17/00* (2006.01)
(Continued)

(52) U.S. Cl.
CPC ............... *G02B 1/14* (2015.01); *B32B 7/023* (2019.01); *C03C 17/007* (2013.01);
(Continued)

(58) Field of Classification Search
CPC ....... G02B 1/11–1/118; C09D 133/04–133/08; C09D 175/04–175/16; B32B 7/00–7/14
See application file for complete search history.

(56) References Cited

U.S. PATENT DOCUMENTS 7,569,269 B2 * 8/2009 Takada ................. C08G 18/673
428/323
2005/0261389 A1 * 11/2005 Bratolavsky ....... C08G 18/2885
522/71

(Continued)

FOREIGN PATENT DOCUMENTS

JP       08122504         5/1996
JP     2013142817         7/2013
(Continued)

OTHER PUBLICATIONS

International Search Report—PCT/KR2016/003159 dated Nov. 18, 2016.

*Primary Examiner* — Prashant J Khatri
(74) *Attorney, Agent, or Firm* — Cantor Colburn LLP

(57) ABSTRACT

Provided is a refractive-index-matching thin film, which is an inorganic crystal thin film, wherein a matching layer including inorganic films having different refractive indices is formed on the surface of a substrate and, more particularly, to a refractive-index-matching thin film, which is configured such that a matching layer including one or more inorganic films having different refractive indices is formed on the surface of a substrate made of a polymer, ceramic, metal or combinations thereof, thus protecting the surface of flexible displays such as curved and bendable displays.

12 Claims, 2 Drawing Sheets

(51) Int. Cl.
*G02B 1/111* (2015.01)
*H04M 1/02* (2006.01)
*B32B 7/023* (2019.01)
*C03C 17/34* (2006.01)
*G02B 5/00* (2006.01)
*C09D 175/04* (2006.01)
*C09D 133/06* (2006.01)

(52) U.S. Cl.
CPC ........ *C03C 17/3429* (2013.01); *C09D 133/06* (2013.01); *C09D 175/04* (2013.01); *G02B 1/111* (2013.01); *H04M 1/0268* (2013.01); *C03C 2217/214* (2013.01); *C03C 2217/216* (2013.01); *C03C 2217/445* (2013.01); *C03C 2217/475* (2013.01); *C03C 2217/78* (2013.01); *C03C 2218/11* (2013.01); *G02B 5/00* (2013.01)

(56) References Cited

U.S. PATENT DOCUMENTS

| | | | | |
|---|---|---|---|---|
| 2007/0259161 | A1* | 11/2007 | Kato | G02B 1/105 |
| | | | | 428/212 |
| 2010/0104838 | A1* | 4/2010 | Noguchi | G02B 1/115 |
| | | | | 428/212 |
| 2010/0291364 | A1* | 11/2010 | Kourtakis | B82Y 20/00 |
| | | | | 428/212 |

FOREIGN PATENT DOCUMENTS

| | | |
|---|---|---|
| JP | 5299271 | 9/2013 |
| JP | 5559486 | 7/2014 |
| JP | 2014186279 | 10/2014 |
| JP | 2015114531 | 6/2015 |
| KR | 20110006141 | 1/2011 |

* cited by examiner

REFRACTIVE-INDEX-MATCHING THIN FILM

TECHNICAL FIELD

The present invention relates to a refractive-index-matching thin film, which is an inorganic crystal thin film, wherein a matching layer comprising inorganic films having different refractive indices is formed on the surface of a substrate and, more particularly, to a refractive-index-matching thin film, which is configured such that a matching layer comprising one or more inorganic films having different refractive indices is formed on the surface of a substrate made of a polymer, ceramic, metal or combinations thereof, thus protecting the surface of flexible displays for curved and bendable smartphones.

BACKGROUND ART

A conventional smartphone is produced in the form of a product having a rigid display, and chemically strengthened glass used to protect the surface of the display. Recently, as novel flexible displays such as curved and bendable displays have come to be utilized in smartphones, it is necessary to develop a cover window for protecting the surface of such a flexible display.

Hence, required is a material suitable for use in the cover window, simultaneously satisfying optical properties, such as a total transmittance of at least 90 to 92% and a haze of 1 to 2%, and physical properties, such as a surface pencil hardness of at least 4 to 6 H.

Moreover, among various materials available for displays, in the case where film layers having different refractive indices, such as a polarizer film, a phase difference film, and a transparent conductive film, are stacked or laminated, optical interference, such as interfacial reflection, or a rainbow or Newton ring phenomenon, attributable to the mismatching of refractive indices, may occur. With the goal of solving these problems, matching of refractive indices is required. In order to set refractive indices to suit the production processes of different display manufacturers, a variety of materials having different refractive indices have to be used, and thus there is a need for a coating composition satisfying the aforementioned optical and physical properties.

DISCLOSURE

Technical Problem

Accordingly, the present invention has been made keeping in mind the above problems encountered in the related art, and the present invention is intended to provide a refractive-index-matching thin film the surface of which resists scratching, the refractive indices of which may be set to suit the production processes of display manufacturers, making it possible to apply it to flexible displays, which has a heat dissipation effect superior to that of conventional glass, which is lightweight to thus achieve weight reduction, which is easy to cut, which resists cracking even when the film is thick, the manufacturing cost of which may be decreased through cheap production processing, and which may be employed in display protection members of various electronic products, flexible boards, glass for buildings, bulletproof glass, or low-dielectric-constant insulating layers for printed circuit boards.

Technical Solution

Therefore, the present invention provides a refractive-index-matching thin film, comprising: a substrate, a first layer formed on one or both surfaces of the substrate and having a first refractive index, and a second layer formed on the surface of the first layer and having a second refractive index, the first refractive index being smaller than the second refractive index.

The first layer may include an inorganic material, and the second layer may include an organic material. The refractive index (nD25) of the first layer preferably ranges from 1.41 to 1.96, and the refractive index (nD25) of the second layer preferably ranges from 1.39 to 1.47.

Advantageous Effects

According to the present invention, the refractive-index-matching thin film can be applied to a variety of flexible displays because the refractive indices thereof can be set to suit the production processes of display manufacturers, and moreover, a heat dissipation effect is superior than that of conventional glass, the thin film is lightweight to thus achieve weight reduction, a cutting process thereof is easy, no cracking occurs even when the film is thick, and the manufacturing cost thereof can be decreased through cheap production processing, and thus, such a thin film can be more appropriately applied to flexible displays to thereby effectively protect such displays.

DESCRIPTION OF THE REFERENCE NUMERALS IN THE DRAWINGS

Figure 1:
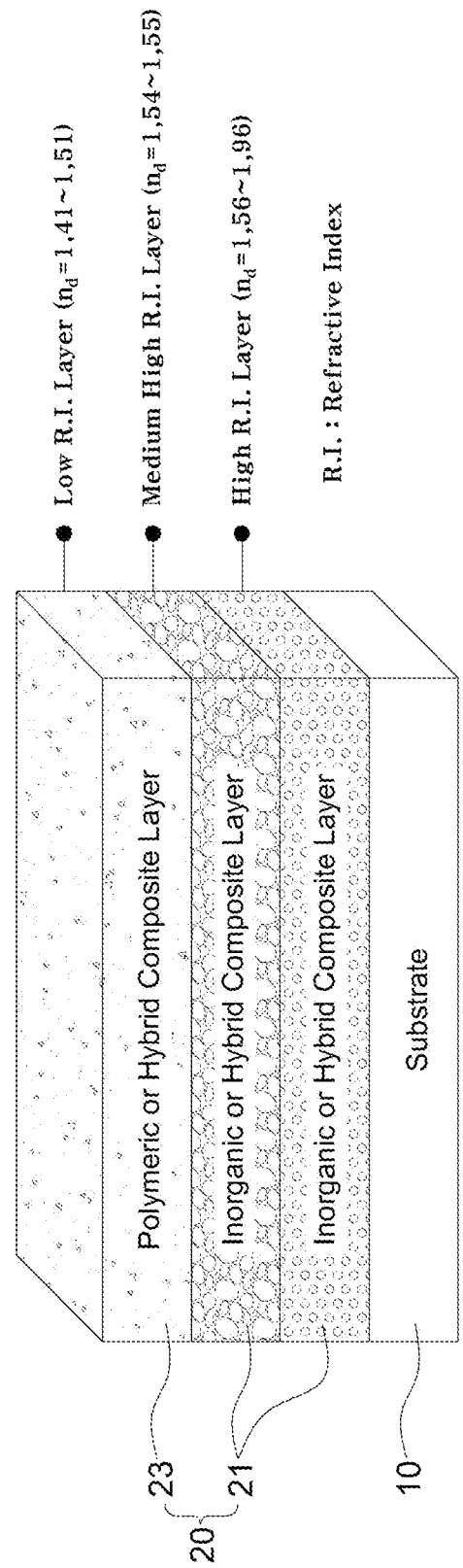
FIG. 1 schematically shows a refractive-index-matching thin film according to the present invention.

10: substrate 20: matching layer
21: inorganic film layer 23: polymeric film layer

BEST MODE

Hereinafter, a detailed description will be given of the present invention with reference to the accompanying drawings.

The present invention will now be described in detail based on aspects (or embodiments). The present invention may, however, be embodied in many different forms and should not be construed as being limited only to the embodiments set forth herein, but should be construed as covering modifications, equivalents or alternatives falling within the ideas and technical scopes of the present invention.

In the figures, like reference numerals, particularly tens and units, or reference numerals having like tens, units and letter portions refer to like elements having like functions throughout, and unless the context clearly indicates otherwise, elements referred to by reference numerals of the drawings should be understood based on this standard.

Also, for convenience of understanding of the elements, in the figures, sizes or thicknesses may be exaggerated to be large (or thick), may be expressed to be small (or thin) or may be simplified for clarity of illustration, but the protective scope of the present invention should not be interpreted narrowly due thereto.

The terminology used herein is for the purpose of describing particular aspects (or embodiments) only and is not intended to be limiting of the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

According to the present invention, a refractive-index-matching thin film is configured to include, as illustrated in FIG. 1, a substrate and a matching layer comprising an inorganic film layer and a polymeric film layer applied on the substrate and having different refractive indices.

As for the substrate included in the refractive-index-matching thin film according to the present invention, the substrate may include all optical and industrial films or sheets, such as PET, TAC, PI, colorless PI, PC, PMMA, PES, and PEN, and the refractive indices of the materials for the refractive-index-matching layer has to be set differently depending on the refractive index of the substrate.

Also, one or both surfaces of the substrate are coated with a matching layer. The matching layer contains inorganic particles, and is configured to include an inorganic film layer comprising multiple inorganic films having different refractive indices formed through a coating process, and a polymeric film layer applied on the inorganic film layer and having a refractive index different from that of the inorganic film layer. Here, the term "inorganic film layer (a first layer)" refers to a layer containing inorganic particles and includes an inorganic hybrid layer having a different material, and the term "polymeric film layer (a second layer)" refers to a layer containing organic (polymer) particles and includes an organic hybrid layer having a different material.

The inorganic film layer includes inorganic particles, and the inorganic particles may include at least one selected from among $Al_2O_3$, ZnO, $TiO_2$, $SiO_2$, AlN, SiC, ALON, CNT, graphene. Among them, when $Al_2O_3$, AlN, SiC, ALON, or CNT is used, transparency, flexibility, surface scratch resistance and heat dissipation properties may be improved, and when ZnO is used, transparency, flexibility, surface scratch resistance and a reduction in dielectric constant may be improved. Furthermore, the use of $TiO_2$ may increase transparency, flexibility, surface scratch resistance and UV-blocking properties, and the use of $SiO_2$ or graphene is effective in achieving transparency, flexibility, surface scratch resistance and reduced reflectance.

The amount of the inorganic particles 22 of the inorganic film layer 20 preferably ranges from 21 vol % to 100 vol %, more preferably from 30 vol % to 100 vol % in terms of hardness, and most preferably from 50 vol % to 100 vol % in order to ensure desired heat dissipation performance and dielectric constant. In the inorganic film layer, the hydroxyl group present on the surface of the inorganic particles is preferably left behind in an amount of 50% or less.

When the inorganic film layer and the polymeric film layer of the matching layer have different refractive indices, optical interference therebetween may occur.

Thus, in order to prevent such optical interference due to the difference between a high refractive index and a low refractive index, a structure is designed such that the refractive index values decrease toward the surface layer from the substrate.

Specifically, the refractive index of the inorganic film layer of the matching layer falls in the range of 1.41 to 1.96, and preferably 1.62 to 1.96, and the refractive index of the polymeric film layer applied on the inorganic film layer falls in the range of 1.39 to 1.61, and preferably 1.39 to 1.47.

If the refractive index of the inorganic film layer is 1.62 or less, optical loss may be caused by inter-layer reflection upon stacking or lamination with a low-refractive-index-matching layer. On the other hand, if the refractive index thereof is 1.96 or more, a reflection may occur at a specific wavelength due to the difference in refractive index between the substrate and the matching layer, undesirably incurring optical loss.

Also, if the refractive index of the polymeric film layer is 1.61 or more, light is transmitted from a dense medium (the surface of the matching layer) to a loose medium (the air layer), and thus, the optical path difference may occur, undesirably significantly increasing the interference of light.

Figure 2:
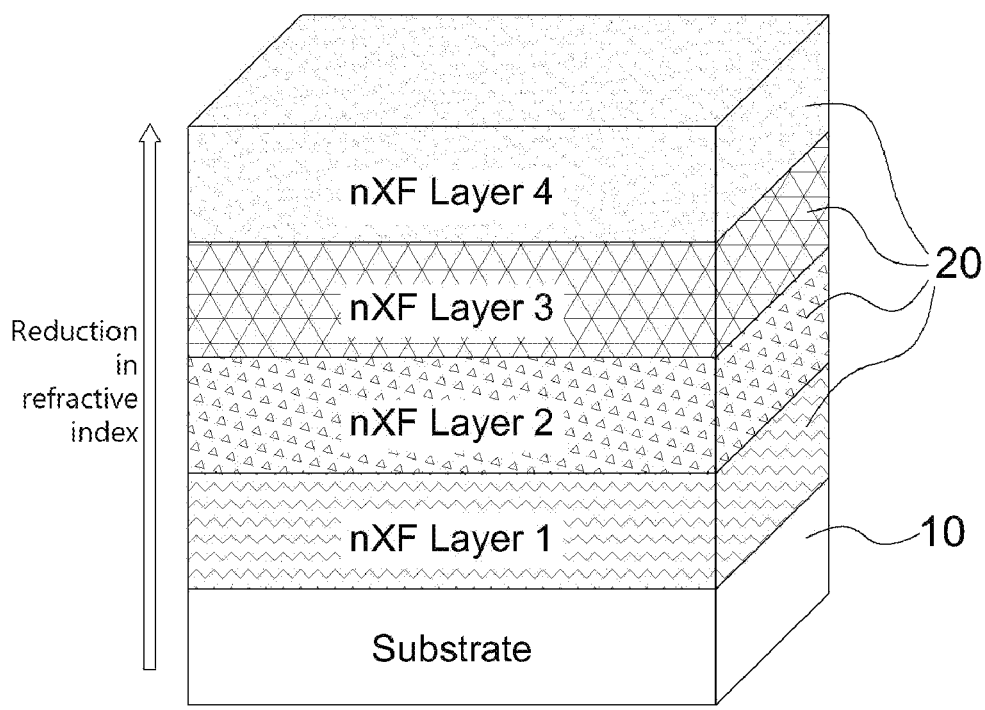
FIG. 2 shows a refractive-index-matching thin film according to an embodiment of the present invention.

As shown in FIG. 2, a multilayered structure in which multiple matching layers are applied on the substrate using a coating process may be provided.

When the multiple matching layers are formed using a coating process in this way, interfacial reflection due to mismatching of refractive indices between the matching layer and the substrate may be minimized, and a coating composition necessary for matching the refractive indices depending on the display device structure may be determined.

Typically, when the difference in refractive indices is large, optical loss may occur due to the inter-layer interfacial reflection. When light is transmitted toward the air layer via the refractive-index-matching layer from the substrate, minimizing the difference in refractive indices between layers may reduce optical loss. Furthermore, when light is transmitted from the layer having a high refractive index toward the layer having a low refractive index, optical interference may significantly occur at the interface therebetween, leading to the interference effect of light. Accordingly, the difference in refractive index between the layers is minimized so that the interference effect of light may be decreased.

The matching layer comprising film layers having different refractive indices may be formed through a wet coating process using a photocurable resin and filler nanoparticles. Each coating composition may be formed so as to be suitable for different wet coating thicknesses depending on the volume of irregularities of a coating bar, and the applied wet coating layer may be dried at 40 to 100° C. (±2° C.) for 1 min, preferably at 50 to 80° C. (±2° C.) for 1 min, and more preferably at 60 to 80° C. (±2° C.) for 1 min, thus forming a dry film, which is then subjected to UV curing, resulting in a coating layer. A UV curing machine may include a light source selected from among a metal halide-type lamp and a high-pressure mercury-type lamp. A LZ-UVC-F402-CMD (HN2) model, made by Lichtzen, was used. The light intensity was measured every trial using a photometer (made by EIT, UV Power Puck II). The light intensity used for evaluation was 0.5 to 2.5 J/cm². The material refractive index results thus achieved are shown in Table 1 below.

TABLE 1

| No. | Nanoparticles, Volume Fraction | UV-curable resin | Refractive index (nD25) |
|---|---|---|---|
| Ex. 1 | $Al_2O_3$, 0.07 | Water dispersion urethane acrylate | 1.412 |
| Ex. 2 | $Al_2O_3$, 0.07 | Isooctyl acrylate | 1.451 |
| Ex. 3 | $Al_2O_3$, 0.07 | OM mixture[2] | 1.497 |
| Ex. 4 | PS[1], 0.07 | OM mixture[2] | 1.506 |
| Ex. 5 | $Al_2O_3$, 0.61 | Tris (2-hydroxy ethyl)isocyanurate diacrylate | 1.539 |
| Ex. 6 | $Al_2O_3$, 0.61 | OM mixture[2] | 1.546 |
| Ex. 7 | $Al_2O_3$, 0.78 | OM mixture[2] | 1.556 |
| Ex. 8 | $Al_2O_3$, 0.78 | High refractive UV-curable resin | 1.632 |
| Ex. 9 | ZnO, 0.78 | Tris (2-hydroxy ethyl)isocyanurate diacrylate | 1.96 |
| C. Ex. 1 | 0 | Water dispersion urethane acrylate | 1.394 |
| C. Ex. 2 | 0 | Isooctyl acrylate | 1.434 |
| C. Ex. 3 | 0 | OM mixture[2] | 1.468 |
| C. Ex. 4 | 0 | Tris(2-hydroxy ethyl)isocyanurate diacrylate | 1.519 |
| C. Ex. 5 | 0 | High refractive UV-curable resin | 1.612 |

[1]PS: Tetramethyltetravinylcyclo-tetrasiloxane
[2]OM mixture: 70 wt % dipentaerythritol hexa-acrylate, 15 wt % di(trimethylolpropane) tetraacrylate, 15 wt % urethane-based oligomer As described above, the matching layer configuration shown in FIG. 2 may be formed such that the refractive index is gradually reduced toward the surface thereof, thereby preventing optical interference.

A better understanding of the present invention regarding an inorganic crystal thin film is obtained through the following examples.

As is apparent from Table 2 below, a coating solution including a photocurable resin and filler nanoparticles, with a volume fraction of the filler nanoparticles being 0.07 (vol %), was prepared. Here, the volume fraction (0.07 vol %) of the filler nanoparticles is a volume fraction thereof in a coating layer measured after final curing of the coating solution.

EXAMPLE 1

An organic-inorganic-hybrid coating composition having a solid content of 35 wt % was prepared by adding and homogeneously mixing, based on the total weight of the coating composition, 13.5 parts by weight of an alumina nanoparticle dispersion (made by BYK, NANOBYK-3602), 30 parts by weight of water dispersion urethane acrylate as a photocurable resin, 3 parts by weight of 1-hydroxycyclohexyl phenyl ketone as a photoinitiator, 2 parts by weight of BYK-UV3500 as a leveling agent, and 51.5 parts by weight of methyl ethyl ketone as an organic solvent, with stirring at room temperature (23±3° C.) for 1 hr at 1000 rpm using a mechanical stirrer and a dissolver-type stirring rod in a batch-type reaction chamber able to block UV light to prevent photopolymerization from an external light source. The coating composition was applied on a PET film, dried at 80° C., and then cured via irradiation with UV light in air using a high-pressure mercury lamp (1 J/cm$^2$), thereby manufacturing an organic-inorganic-hybrid coating thin film.

EXAMPLES 2 TO 4

Respective thin films were manufactured in the same manner as in Example 1, with the exception that the photocurable resins shown in Tables 1 and 2 were used.

COMPARATIVE EXAMPLE 1

As shown in Table 2, a coating composition having a solid content of 35 wt % was prepared by adding and homogeneously mixing, based on the total weight of the coating composition, 30 parts by weight of water dispersion urethane acrylate as a photocurable resin, 3 parts by weight of 1-hydroxycyclohexyl phenyl ketone as a photoinitiator, 2 parts by weight of BYK-UV3500 as a leveling agent, and 65 parts by weight of methyl ethyl ketone as an organic solvent, with stirring at room temperature (23±3° C.) for 1 hr at 1000 rpm using a mechanical stirrer and a dissolver-type stirring rod in a batch-type reaction chamber able to block UV light to prevent photopolymerization from an external light source. The coating composition was applied on a PET film, dried at 80° C., and then cured via irradiation with UV light in air using a high-pressure mercury lamp (1 J/cm$^2$), thereby manufacturing an organic coating thin film.

COMPARATIVE EXAMPLES 2 AND 3

Respective thin films were manufactured in the same manner as in Comparative Example 1, with the exception that the photocurable resins shown in Tables 1 and 2 were used.

1) Measurement of Refractive Index

A refractive index was measured at a wavelength of 633 nm via a fitting process based on the ellipsometric dispersion function using an ellipsometer (made by Ellipso Technology, Elli-SE).

2) Light Transmittance and Haze

Total transmittance and haze were measured using a spectrophotometer (made by Nippon Denshoku, Japan, NDH300A).

3) Pencil Hardness

Pencil hardness was measured under a load of 750 g using a pencil hardness tester according to ASTM D3502.

4) Adhesion

Onto a 5 mm thick glass board having a piece of double-sided tape attached thereto, each of the organic-inorganic-hybrid thin films of the Examples and the organic thin films of Comparative Examples the was adhered such that the matching layer thereof was positioned outwards. Subsequently, lattice pattern cuts forming 100 squares were made in the thin film ranging from the matching layer to the substrate using a cutter guide having a gap interval of 2 mm. Then, a piece of adhesive tape (made by Nichiban, No. 405; width 24 mm) was attached to the surface of the lattice pattern cuts. The air remaining at the interface upon attachment was completely removed using an eraser and thus the adhesive tape was completely adhered, after which the adhesive tape was forcibly vertically detached, and the adhesion was observed with the naked eye based on the following Equation. Also, the case of a square having partial detachment was combined to count the number of detached squares.

Adhesion(%)=(1−number of detached squares/100)×100

⊚: Adhesion (%) of 90 to 100%
○: Adhesion (%) of 80 to 89%
x: Adhesion (%) of 0 to 79%

The test conditions and results are summarized in Table 2 below.

TABLE 2

| No. | Test conditions ||||||| Test results ||||
|---|---|---|---|---|---|---|---|---|---|---|
| | Volume fraction of nanoparticles | A | B | Photo-initiator | Leveling agent | Organic solvent | Refractive index | Light transmittance (%) | Haze (%) | Pencil hardness | Adhesion |
| Ex. 1 | 0.07 | 13.5 | 25 | 3 | 2 | 56.5 | 1.412 | 91.8 | 1.09 | 2H | ⊚ |
| Ex. 2 | 0.07 | 13.5 | 25 | 3 | 2 | 56.5 | 1.451 | 90.6 | 1.14 | 3H | ⊚ |
| Ex. 3 | 0.07 | 13.5 | 25 | 3 | 2 | 56.5 | 1.497 | 91.2 | 1.21 | 5H | ⊚ |
| Ex. 4 | 0.07 | 5 | 25 | 3 | 2 | 65 | 1.506 | 90.2 | 1.37 | 4H | ⊚ |
| C. Ex. 1 | 0 | 0 | 30 | 3 | 2 | 65 | 1.394 | 91.6 | 1.01 | F | X |
| C. Ex. 2 | 0 | 0 | 30 | 3 | 2 | 65 | 1.434 | 90.4 | 0.98 | B | ○ |
| C. Ex. 3 | 0 | 0 | 30 | 3 | 2 | 65 | 1.468 | 90.0 | 1.21 | 2H | ⊚ |

A: Nanoparticle dispersion
B: Photocurable resin

As is apparent from the above test results, in Examples (1 to 4) and Comparative Examples (1 to 3), when the volume fraction of alumina nanoparticles or polysiloxane in the coating composition was increased to 0.07, the refractive index and pencil hardness were improved. When the volume fraction of the nanoparticles was 0.07 or less, a low-refractive-index-matching layer was formed.

EXAMPLE 5

A coating solution comprising a photocurable resin and filler nanoparticles was prepared, in which the volume fraction of the filler nanoparticles was 0.61, as shown in Table 3 below. Specifically, an organic-inorganic-hybrid coating composition having a solid content of 35 wt % was prepared by adding and homogeneously mixing, based on the total weight of the coating composition, 11.4 parts by weight of an alumina nanoparticle dispersion (made by BYK, NANOBYK-3602), 25.8 parts by weight of tris(2-hydroxyethyl)isocyanurate diacrylate as a photocurable resin, 3 parts by weight of 1-hydroxycyclohexyl phenyl ketone as a photoinitiator, 2 parts by weight of BYK-UV3500 as a leveling agent, and 57.8 parts by weight of methyl ethyl ketone as an organic solvent, with stirring at room temperature (23±3° C.) for 1 hr at 1000 rpm using a mechanical stirrer and a dissolver-type stirring rod in a batch-type reaction chamber able to block UV light to prevent photopolymerization from an external light source. The coating composition was applied on a PET film, dried at 80° C., and then cured via irradiation with UV light in air using a high-pressure mercury lamp (1 J/cm$^2$), thereby manufacturing an organic-inorganic-hybrid coating thin film.

EXAMPLES 6 TO 8

Respective thin films were manufactured in the same manner as in Example 5, with the exception that the photocurable resins and the nanoparticles having the volume fractions shown in Tables and 3 were used.

EXAMPLE 9

A thin film was manufactured in the same manner as in Example 5, with the exception that the photocurable resin and ZnO nanoparticles having the volume fraction shown in Tables 1 and 3 were used.

COMPARATIVE EXAMPLE 4

As shown in Table 2, a coating composition having a solid content of 35 wt % was prepared by adding and homogeneously mixing, based on the total weight of the coating composition, 30 parts by weight of tris(2-hydroxyethyl) isocyanurate diacrylate as a photocurable resin, 3 parts by weight of 1-hydroxycyclohexyl phenyl ketone as a photoinitiator, 2 parts by weight of BYK-UV3500 as a leveling agent, and 65 parts by weight of methyl ethyl ketone as an organic solvent, with stirring at room temperature (23±3° C.) for 1 hr at 1000 rpm using a mechanical stirrer and a dissolver-type stirring rod in a batch-type reaction chamber able to block UV light to prevent photopolymerization from an external light source. The coating composition was applied on a PET film, dried at 80° C., and then cured via irradiation with UV light in air using a high-pressure mercury lamp (1 J/cm$^2$), thereby manufacturing an organic coating thin film.

COMPARATIVE EXAMPLE 5

A thin film was manufactured in the same manner as in Comparative Example 4, with the exception that the photocurable resin shown in Tables 1 and 3 was used.

The test conditions and results of the above Examples and Comparative Examples are shown in Table 3 below.

TABLE 3

| No. | Test conditions ||||||| Test results ||||
|---|---|---|---|---|---|---|---|---|---|---|
| | Volume fraction of nanoparticles | A | B | Photo-initiator | Leveling agent | Organic solvent | Refractive index | Light transmittance (%) | Haze (%) | Pencil hardness | Adhesion |
| Ex. 5 | 0.61 | 11.4 | 25.8 | 3 | 2 | 57.8 | 1.539 | 91.4 | 1.28 | 4H | ⊚ |
| Ex. 6 | 0.61 | 11.4 | 25.8 | 3 | 2 | 57.8 | 1.546 | 91.2 | 1.32 | 8H | ⊚ |
| Ex. 7 | 0.78 | 40.5 | 15 | 3 | 2 | 39.5 | 1.556 | 90.1 | 3.2 | 9H | ⊚ |
| Ex. 8 | 0.78 | 40.5 | 15 | 3 | 2 | 39.5 | 1.632 | 91.4 | 2.47 | 8H | ⊚ |
| Ex. 9 | 0.78 | 37.5 | 15 | 3 | 2 | 42.5 | 1.96 | 91.6 | 2.77 | 8H | ⊚ |

TABLE 3-continued

| | Test conditions | | | | | | Test results | | | |
|---|---|---|---|---|---|---|---|---|---|---|
| No. | Volume fraction of nanoparticles | A | B | Photo-initiator | Leveling agent | Organic solvent | Refractive index | Light transmittance (%) | Haze (%) | Pencil hardness | Adhesion |
| C. Ex. 4 | 0 | 0 | 30 | 3 | 2 | 65 | 1.519 | 90.7 | 0.87 | F | ◎ |
| C. Ex. 5 | 0 | 0 | 30 | 3 | 2 | 65 | 1.468 | 90.0 | 1.21 | 2H | ◎ |

A: Nanoparticle dispersion
B: Photocurable resin

As is apparent from Table 3, the refractive index was improved depending on the kind and volume fraction of nanoparticles and photocurable resin. Thus, high-refractive-index-coating layers having various refractive indices may be formed, and also, the pencil hardness may be estimated to be increased with an increase in the volume fraction of the nanoparticles.

As shown in the above Examples, the photoinitiator of the coating composition may include at least one selected from the group consisting of 2-hydroxyl-2-methyl-1-phenyl propanone, n-butylamine, triethylamine, 2-hydroxyl-1-(4-(2-hydroxyethoxy)phenyl)-2-methylpropanone, 1-hydroxycyclohexyl phenyl methanone, 2,2'-dimethoxy-1,2-diphenyl ethanone, diphenylphosphorylmesityl methanone, phenylphosphorylbis(mesitylmethanone), (s)-2-benzyl-2-(dimethylamino)-1-(4-morpholinophenyl)butanone, and 2-methyl-2-(4-(methylthio)phenyl)-2-morpholinopropanone.

Also, the leveling agent may include at least one selected from the group consisting of BYK UV-3500, 3505, 3530, 3535, 3570, 3575, and 3576.

In the above Examples, the amount of the dispersion is preferably 11 to 14 parts by weight, and most preferably 11.4 parts by weight. If the amount of the dispersion is less than 11 parts by weight, the effect of increasing pencil hardness may decrease. On the other hand, if the amount thereof exceeds 14 parts by weight, the optical properties may deteriorate due to increased haze.

Furthermore, the refractive-index-matching thin film according to the present invention may be applied to a variety of fields, including those of glass boards, films or devices for displays, protective films, electronic products, plastic boards, products for cars, etc.

Although the inorganic crystal thin film having the specific shape and structure according to the preferred embodiments of the present invention has been disclosed with reference to the accompanying drawings, those skilled in the art will appreciate that various modifications, additions and substitutions are possible, without departing from the scope and spirit of the invention as disclosed in the accompanying claims.

The invention claimed is:
1. A refractive-index-matching thin film, comprising:
a substrate;
a first layer formed on one or both surfaces of the substrate and having a first refractive index; and
a second layer formed on a surface of the first layer and having a second refractive index,
wherein the second refractive index is smaller than the first refractive index,
wherein the first layer includes nanoparticles and a volume fraction of the nanoparticles is 0.61 to 0.78, and
wherein the first layer comprises 11 to 14 parts by weight of a nanoparticle dispersion and 25 to 26 parts by weight of tris(2-hydroxyethyl)isocyanurate diacrylate as a photoreactive acrylate.
2. The refractive-index-matching thin film of claim 1, wherein the first refractive index ($nD^{25}$) ranges from 1.41 to 1.96.
3. The refractive-index-matching thin film of claim 1, wherein the second refractive index ($nD^{25}$) ranges from 1.39 to 1.47.
4. The refractive-index-matching thin film of claim 1, wherein the substrate comprises: a film made of any one selected from the group consisting of polyethylene terephthalate (PET), tri-acetyl cellulose (TAC), polyimide (PI), colorless PI, polycarbonate (PC), polymethyl methacrylate (PMMA), poly(ether sulfone) (PES), and polyethylene naphthalate (PEN).
5. The refractive-index-matching thin film of claim 1, wherein the first layer further comprises 3 parts by weight of a photoinitiator, 2 parts by weight of a leveling agent, and 57.8 parts by weight of an organic solvent.
6. A glass board, comprising the refractive-index-matching thin film of claim 1.
7. A film for a display, comprising the refractive-index-matching thin film of claim 1.
8. A protective film, comprising the refractive-index-matching thin film of claim 1.
9. An electronic product, comprising the refractive-index-matching thin film of claim 1.
10. A plastic board, comprising the refractive-index-matching thin film of claim 1.
11. A product for a car, comprising the refractive-index-matching thin film of claim 1.
12. A device for a display, comprising the refractive-index-matching thin film of claim 1.

* * * * *